US 7,881,821 B2

(12) United States Patent
Kampani et al.

(10) Patent No.: US 7,881,821 B2
(45) Date of Patent: Feb. 1, 2011

(54) MEDIA STORAGE SYSTEM

(75) Inventors: Atul K. Kampani, Edison, NJ (US);
Pranav A. Kampani, Edison, NJ (US)

(73) Assignee: Shyam Consultants, LLC, Edison, NJ (US)

( * ) Notice: Subject to any disclaimer, the term of this patent is extended or adjusted under 35 U.S.C. 154(b) by 688 days.

(21) Appl. No.: 11/850,444

(22) Filed: Sep. 5, 2007

(65) Prior Publication Data

US 2009/0064210 A1  Mar. 5, 2009

(51) Int. Cl.
*G06F 17/00* (2006.01)
*G06F 7/00* (2006.01)
*G11B 15/18* (2006.01)
*G11B 17/00* (2006.01)
*G11B 19/02* (2006.01)
*G11B 20/06* (2006.01)

(52) U.S. Cl. .................. 700/226; 700/231; 360/71; 360/69; 360/30

(58) Field of Classification Search .................. None
See application file for complete search history.

(56) References Cited

U.S. PATENT DOCUMENTS

| 6,243,328 | B1 | 6/2001 | Fenner et al. |
| 6,710,962 | B1 * | 3/2004 | Caverly et al. ................ 360/69 |
| 7,006,318 | B2 | 2/2006 | Stence et al. |
| 7,046,586 | B1 * | 5/2006 | Creager et al. ........... 369/30.28 |
| 2006/0195789 | A1 * | 8/2006 | Rogers et al. ............... 715/727 |

* cited by examiner

*Primary Examiner*—Gene Crawford
*Assistant Examiner*—Yolanda Cumbess
(74) *Attorney, Agent, or Firm*—Dale J. Ream

(57) ABSTRACT

A media storage system includes a disc input element for receiving a media disc, a disc output element for ejecting a disc, and a media reader for reading information from a disc. If insufficient information is readable from a disc, it may be obtained through a computer network. The system includes a disc transporter for moving received discs to respective internal storage locations. The system includes a data input device for entering disc catalogue data and a data output device such as a display for displaying disc catalogue data. The data input and output devices may be input buttons and a display on a remote control. Each disc and related information is associated with an identifier such that access to disc data may be by restricted by user identifier or content ratings.

6 Claims, 7 Drawing Sheets

MEDIA STORAGE SYSTEM

BACKGROUND OF THE INVENTION

This invention relates generally to consumer electronics and, more particularly, to a media storage device for cataloguing, storing, and retrieving data discs such as CD's, DVD's, and other data discs. The media storage system enables users to insert discs into a storage unit where information may be read, gathered, and catalogued for future referenced by a user and the disc ejected upon demand.

Users of DVD's and compact discs—whether containing music, movies, or other digital data—often find it difficult to keep track of their collections of discs and their contents. Even if they maintain possession of the discs, being able to quickly identify the contents thereof is still a challenge. The scope of the problem of managing a disc library is better understood when considering individuals or organizations having 100, 500, or more data discs. Not only does the disc library need to be kept in a secure and organized location, the contents of the discs need to be accessed on demand and from locations remote from the actual storage location.

Various devices have been proposed in the art for storing data discs and even for cataloguing the contents thereof. Although assumably effective for their intended purposes, the existing devices do not provide for accessing the contents of the disc library, cataloguing new disc content, or ejecting stored discs from a remote location.

Therefore, it would be desirable to have a media storage system that receives media discs, reads data from the discs for cataloguing purposes, transports received discs to storage locations, and ejects stored discs upon demand. Further, it would be desirable to have a media storage system that makes catalogue data available for review by users in proximity to the storage system or from remote locations. In addition, it would be desirable to have a media storage system that controls access by user identifiers, by content ratings, etc.

SUMMARY OF THE INVENTION

Accordingly, a media storage device according to the present invention includes a disc reading location and a disc input element for accepting a respective media disc from outside the storage system to said disc reading location. The storage device also includes a disc output element for ejecting a respective media disc from the disc reading location to a place outside of the storage system. The storage device includes a plurality of disc storage locations each having a unique storage identifier. A disc transporter is included in the storage system for moving respective media discs between the disc reading location and the disc storage locations. In addition, a media reader is situated adjacent the disc reading location.

A processor is in data communication with a memory device, a data input device, a data output device, the media reader, the disc transporter, and the disc output element. The processor includes programming for obtaining title data for a respective media disc received at the disc reading location from outside the storage system. Further, the processor includes programming for associating in the memory device the title data with a respective unique storage identifier for a respective storage location which at that moment does not store a respective media disc. Still further, the processor includes programming for actuating the disc transporter to transport the media disc from the disc reading location to the storage location having the unique storage identifier associated with the title data of the media disc.

An important aspect of the present invention is that the output device may be a display on a remote control and the input device may be an input on the remote control. The display and the input are in data communication with the processor via radio respective transmitters and receivers. The processor of the media storage system includes programming for actuating the display to present a list of all title data for media discs stored in the system.

Therefore, a general object of this invention is to provide a media storage system for physically storing data discs such as CD's and DVD's.

Another object of this invention is to provide a media storage system, as aforesaid, for reading, collecting, or entering data regarding the content of each disc and making that data available for review on an output device such as a display screen.

Still another object of this invention is to provide a media storage system, as aforesaid, in which disc data is available to authorized users.

Yet another object of this invention is to provide a media storage system, as aforesaid, in which disc data may be accessible from a remote control device.

A further object of this invention is to provide a media storage system, as aforesaid, in which discs may be associated together by association with respective users, according to content ratings, etc.

A still further object of this invention is to provide a media storage system, as aforesaid, that ejects selected discs upon request by an authorized user.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
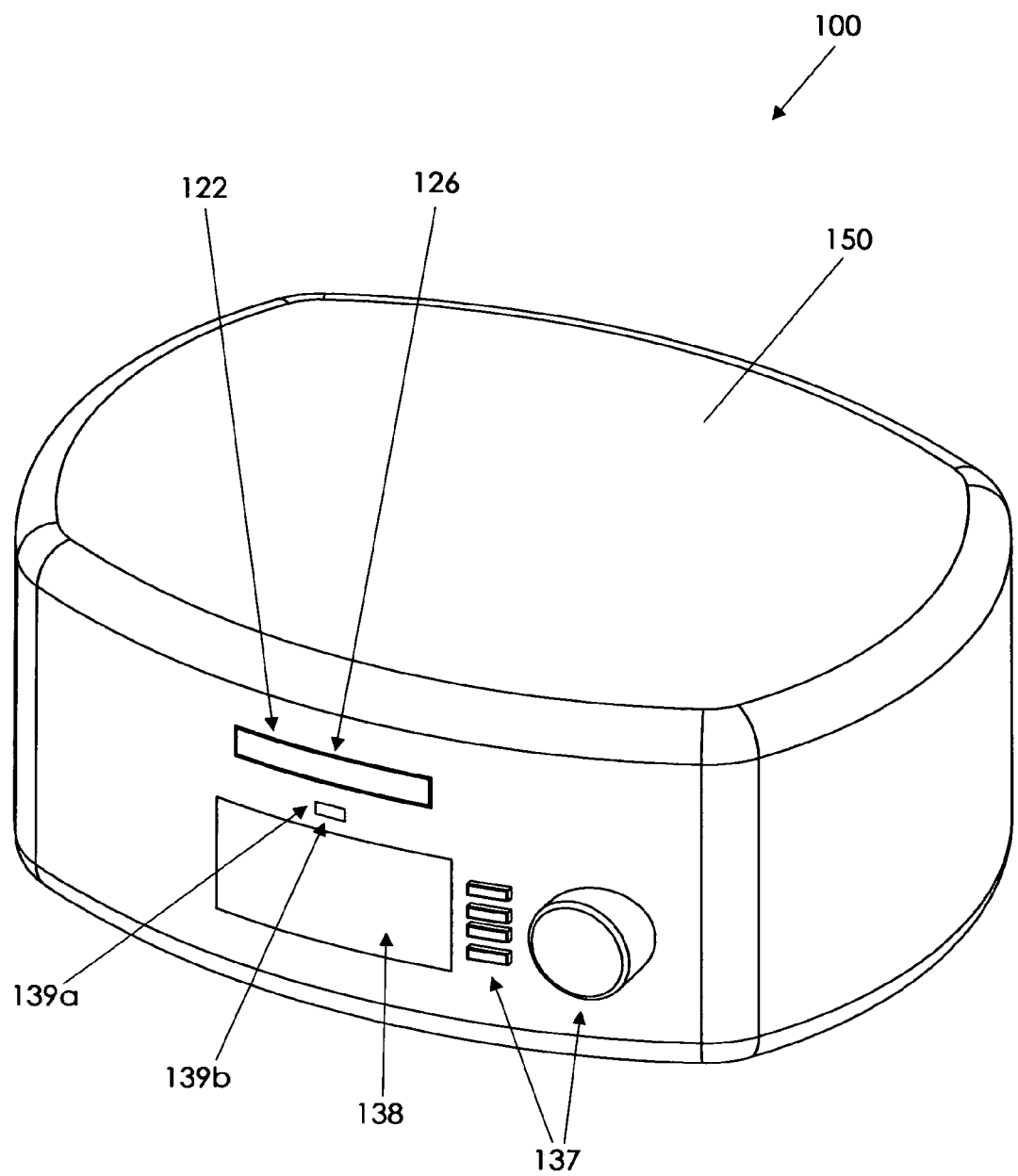
FIG. 1 is a perspective view of a media storage system according to a preferred embodiment of the present invention.

A media storage system 100 according to the present invention will now be described in detail with reference to FIGS. 1 through 6b of the accompanying drawings. More particularly, according to the current invention, a media storage system 100 for use with a plurality of media discs (e.g., CDs, DVDs, etc.) includes a disc reading location 112 and a plurality of disc storage locations 114 (FIG. 6a). Each disc storage location 114 has a unique storage identifier (i.e., a unique identification number).

As shown in FIG. 6a, a disc input element 122 is included for accepting a media disc from outside the storage system 100 to the reading location 112, or in other words, for inputting a media disc from outside the storage system 100 to the reading location 112. A disc transporter 124 moves respective media discs between the reading location 112 and the disc storage locations 114. A disc output element 126 is included for ejecting a media disc from the reading location 112 to outside the storage system 100. More particularly, the disc output element 126 may eject all media discs transported to the reading location 112 by the disc transporter 124. A media reader 132 (FIGS. 3, 6a, and 6b) is adjacent the disc reading location 112 to obtain data from respective media discs at the reading location 112.

Figure 2:
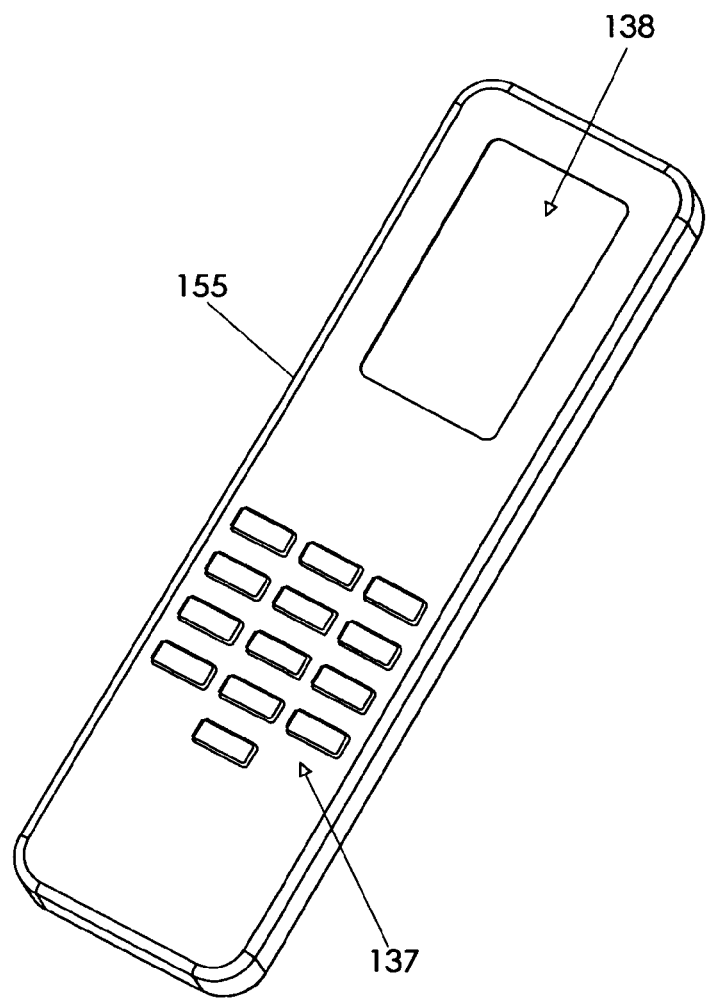
FIG. 2 is a perspective view of a remote control device for use with the media storage system as in FIG. 1.
Figure 3:
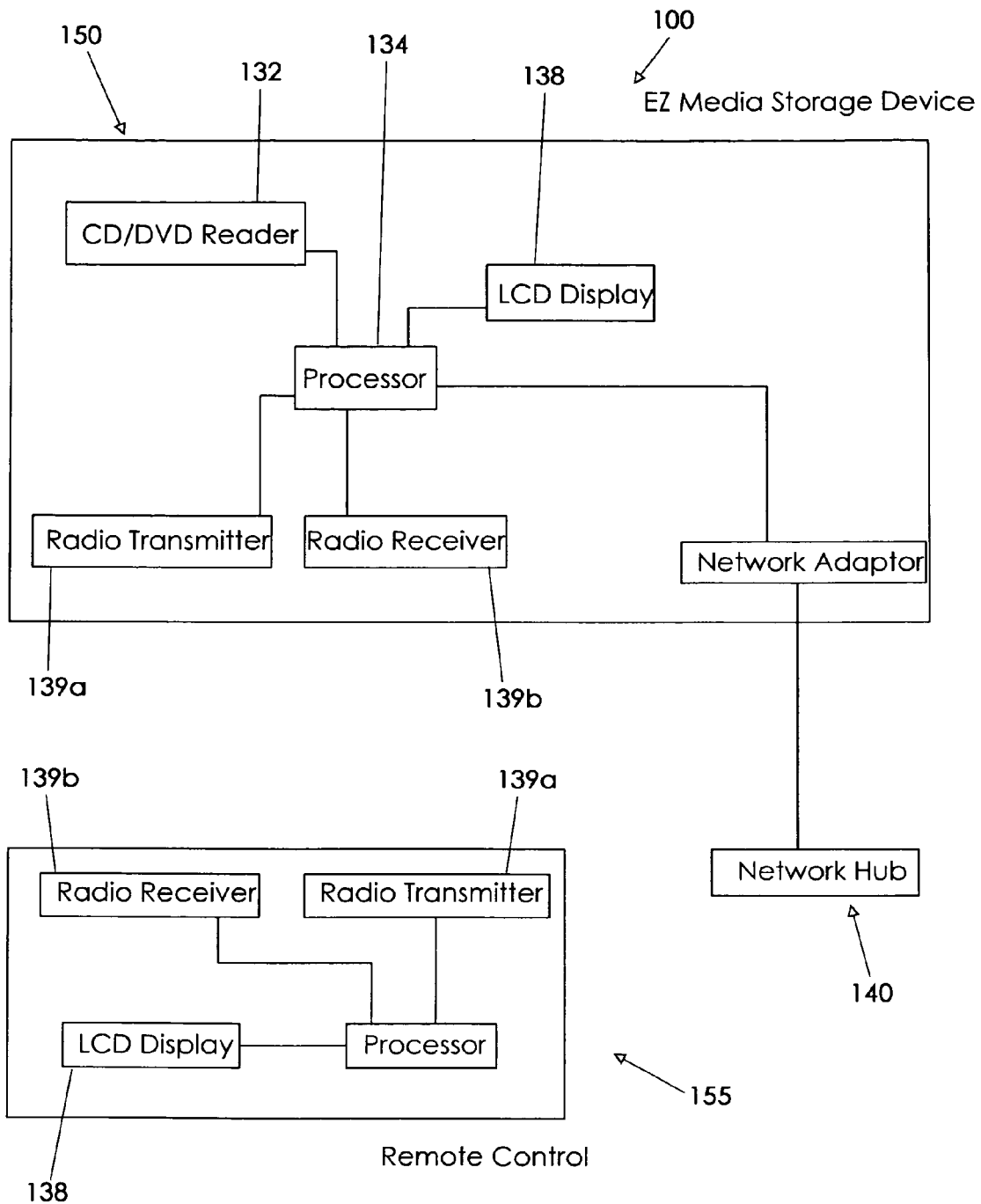
FIG. 3 is a block diagram illustrating the communication and display components according to the present invention.
Figure 6A:
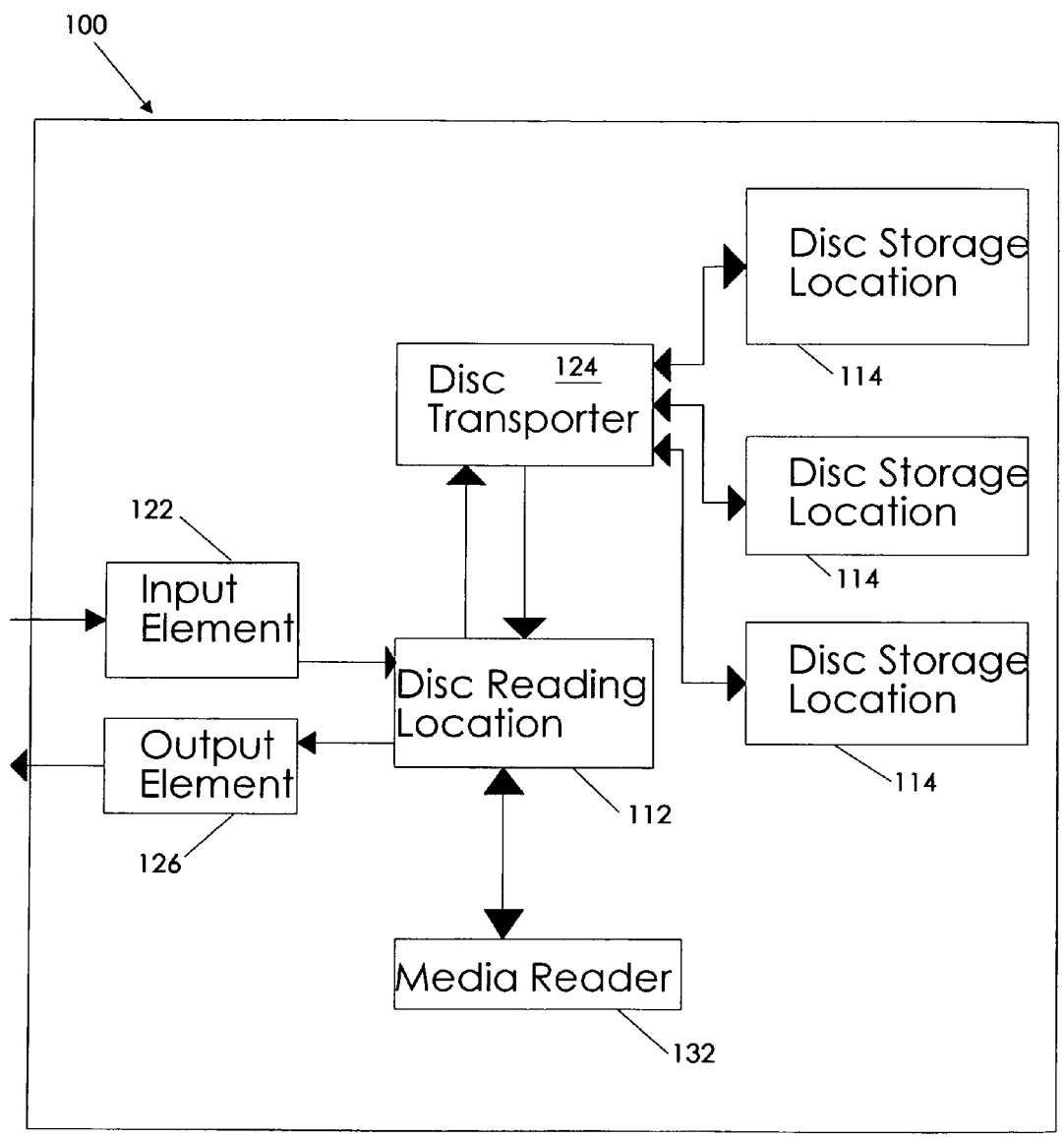
FIG. 6a is a block diagram illustrating the disc reading and storage location configurations according to the present invention.
Figure 6B:
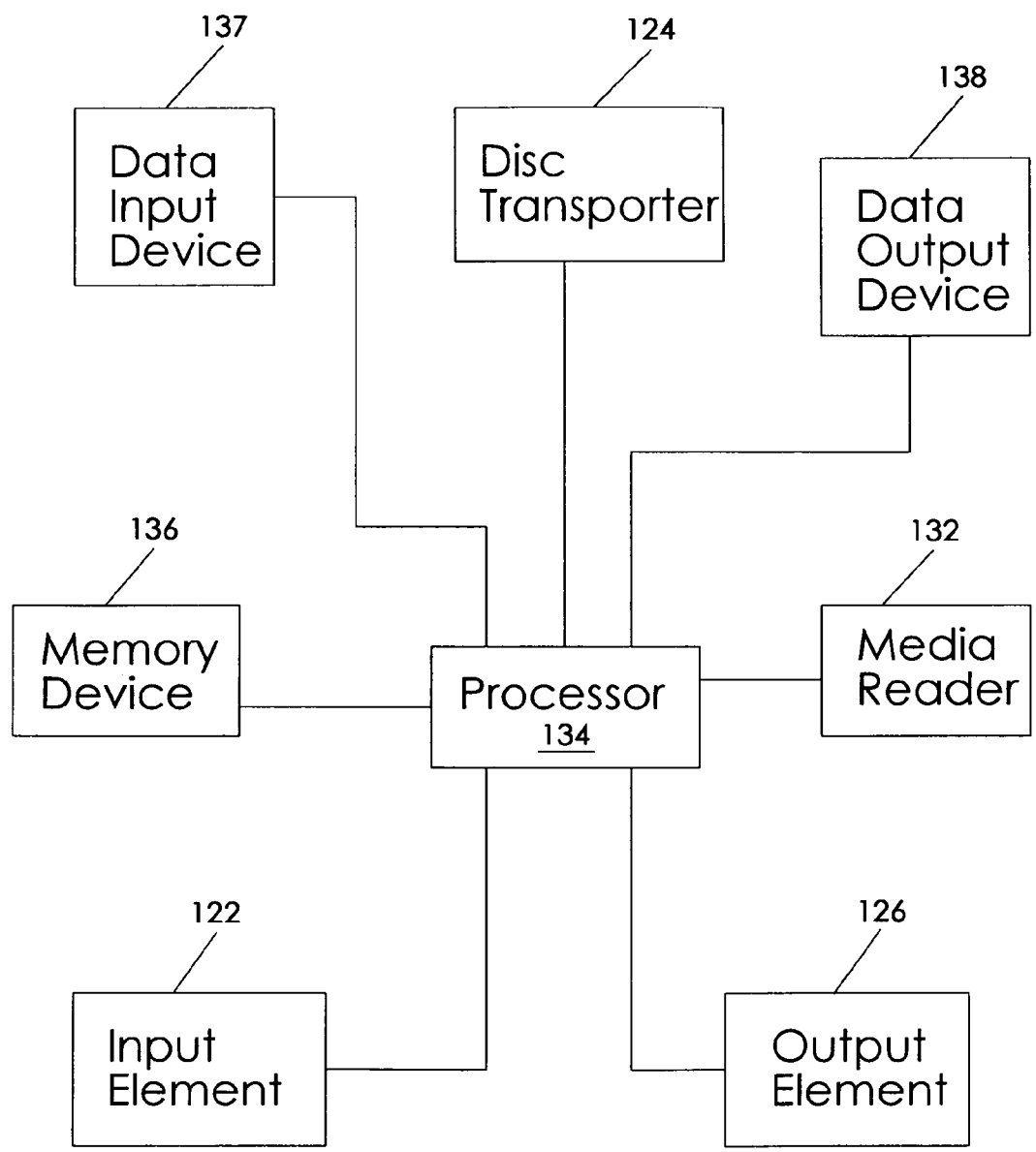
FIG. 6b is block diagram of the disc input, output, and transporter components.

As shown in FIGS. 3 and 6b, a processor 134 may be in data communication with a memory device 136, a data input device 137, a data output device 138 (e.g., a display), the media reader 132, the disc transporter 124, the disc input element 122, the disc output element 126, and/or a network 140 (e.g., the internet, etc.). A housing 150 (FIGS. 1 and 6a) may contain the reading location 112, the plurality of disc storage locations 114, the disc transporter 124, the processor 134, the memory device 136, and the media reader 132. The housing 150 may further contain the display 138 and the input device 137, as shown in FIG. 1, and/or a remote control 155 may include the display 138 and the input device 137, as shown in FIGS. 2 and 3. The display 138 and the input device 137 may be in data communication with the processor 134 via radio transmitters and receivers 139a, 139b (FIG. 3) or any other appropriate communication technology.

Figure 4:
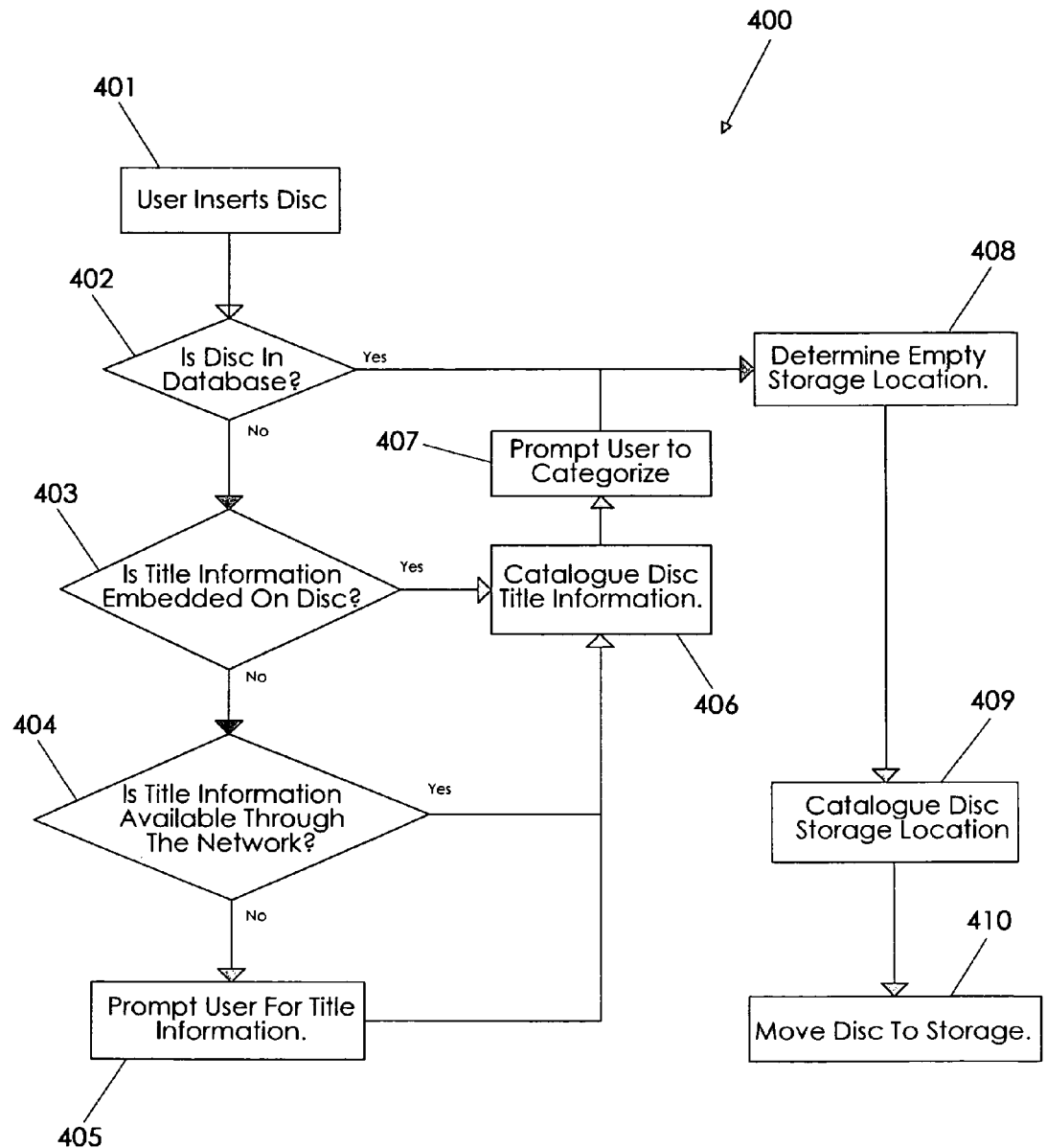
FIG. 4 is a flowchart illustrating a routine that may be conducted by a processor according to the present system for obtaining title data of a disc.

The processor 134 may include programming for obtaining title data for each respective media disc input to the reading location 112 by the input element 122. FIG. 4 shows a routine 400 that may be performed by the processor 134. Steps 401, 402, 403, 404, and 405 represent more specific programming in the processor 134 for obtaining title data. At step 401, the input element 122 provides a respective media disc to the reading location 112, and the media reader 132 obtains identifying data from the media disc (e.g., amount of data, number of files/tracks, length of tracks, etc.). The routine 400 proceeds to step 402, where the processor 134 compares the identifying data to identifying data maintained in the memory device 136. If the processor 134 determines that the media disc is already known to the system 100, the processor 134 obtains the title data from the memory device 136 and the routine 400 proceeds to step 408; if not, the routine 400 continues to step 403.

At step 403, the processor 134 attempts to obtain the title data from the media reader 132. If the media disc includes the title data, the media reader 132 provides the title data to the processor 134 and the routine 400 proceeds to step 406; if not, the routine 400 continues to step 404.

At step 404, the processor 134 attempts to obtain the title data from the network 140 based on the identifying data obtained from the media reader 132. If the network 140 provides the title data to the processor 134, the routine proceeds to step 406; if not, the routine continues to step 405.

At step 405, the processor 134 actuates the display 138 to request the title data from the data input device 137. Once the title data is provided by the data input device 137, the routine proceeds to step 406.

At step 406, the processor 134 stores the title data and corresponding identifying data in the memory device 136, and the routine 400 proceeds to step 407. At step 407, the processor 134 actuates the display 138 to request categorization data (i.e., movie, music, genre, pictures, documents, etc.), and the categorization data may be provided using the data input device 137 and stored along with the title data in the memory device 136. The processor 134 may include programming for actuating the display 138 to present a list of all title data for media discs stored in the system 100, and this presentation may be enhanced if categorization data is present (i.e., all music can be shown in one grouping, all movies can be shown in another grouping, etc.). The routine 400 proceeds from step 407 to step 408.

At step 408, the processor 134 determines which disc storage location(s) 114 is/are not currently storing any media disc. This may be done by referencing the memory device 136, for example. The routine 400 proceeds from step 408 to step 409.

At step 409, the processor 134 associates (in the memory device 136) the title data of the media disc at the reading location 112 with the respective unique storage identifier for the empty storage location 114 which is going to store the media disc. The empty storage location 114 may be chosen randomly, or the storage location 114 may be deliberately chosen. For example, the processor 134 may include programming for tracking access frequency corresponding to each title data (i.e., to each media disc), or in other words, for tracking how often each media disc is accessed from the system 100. If two storage locations 114 are vacant, and an amount of time required for the disc transporter 124 to transport a respective media disc from the first location 114 to the reading location 112 is less than an amount of time required for the disc transporter 124 to transport a respective media disc from the second location 114 to the reading location 112, how frequently a media disc is accessed may determine if the first or second storage location 114 is chosen. The routine 400 proceeds from step 409 to step 410.

At step 410, the processor 134 actuates the disc transporter 124 to transport the media disc from the reading location 112 to the storage location 114 having the unique storage identifier which was associated with the title data of the media disc in step 409.

Once a respective media disc is at a respective storage location 114, a user may request the media disc from the system 100, such as by using the input device 137. The processor 134 includes programming for recognizing a disc request from the input device 137. A disc request includes title data of the desired media disc, and optionally access level data. Access level data is discussed below in relation to FIG. 5. The processor 134 may further include programming for determining a respective unique storage identifier associated with the title data included in the disc request (such as by accessing the memory device 136), and programming for actuating the disc transporter 124 to transport the desired media disc from the disc storage location 114 having the unique storage identifier to the reading location 112. As noted above, the disc output element 126 ejects media discs transported to the reading location 112 by the disc transporter 124.

Figure 5:
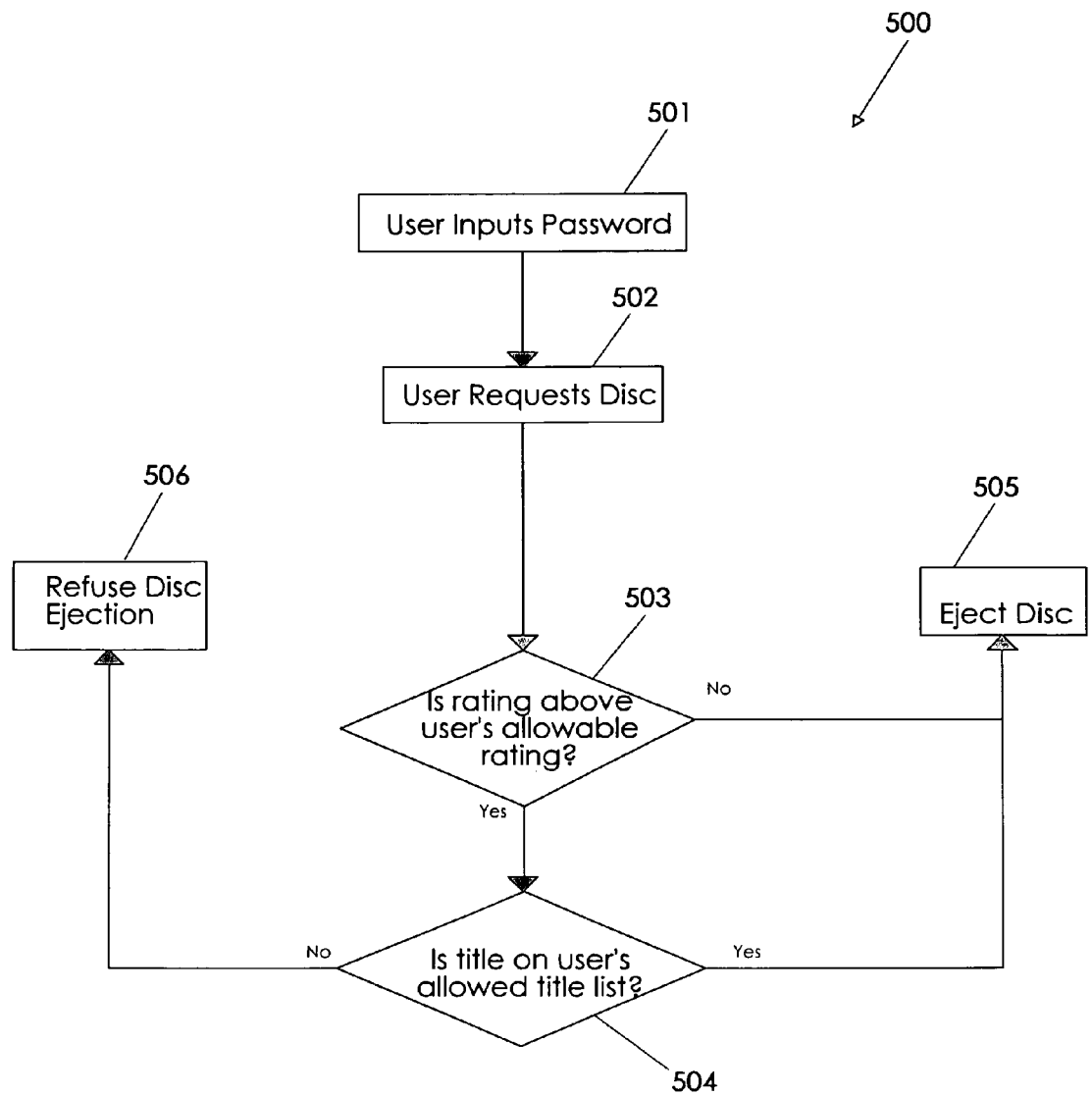
FIG. 5 is a routine that may be performed by the processor for restricting access to stored disc data.

FIG. 5 shows a routine 500 that may be performed utilizing system 100 and programming in the processor 134. Similar to the programming in the processor 134 for obtaining title data (discussed above), the processor 134 may include programming for obtaining respective access requirement data for each media disc inside the storage system 100 and associating (in the memory device 136) the access requirement data with the title data for each media disc. Access requirement data can be, for example, user specific, group specific, content related, etc. For example, access requirement data may be "G", "PG-13", or "R" for movies, "parent only", age-related for video games, etc. Simply put, access requirement data represents what level of access a user must possess before he can obtain the media disc.

To obtain access requirement data, the processor 134 may include programming for obtaining the access requirement data from the media reader 132, programming for obtaining the access requirement data from the memory device 136 based on the identifying data obtained from the media reader 132 as discussed above, programming for obtaining the access requirement data from the network 140 based on the identifying data obtained from the media reader 132, and/or programming for actuating the display 138 to request the access requirement data from the input device 137 if the access data cannot be obtained from the media reader 132 or the memory device 136 or if the access data obtained from the media reader 132 or memory device 136 is unsatisfactory.

At step 501, the user utilizes the input device 137 to input a personal identifier, such as a password or name. The personal identifier may be the access level data noted above, or the personal identifier may be associated with access level data in the memory device 136. At step 502, the user utilizes the input device 137 to select a media disc in the system and provide a disc request having the title data and the access level data. The routine 500 proceeds to step 503.

At step 503, the processor 134 determines if the access level data included in the disc request is sufficient for the access requirement data associated with the title data included in the disc request. For example, The access requirement data associated with the title data included in the disc request may be "PG-13". If the access level data were "PG-13" or "R", the access level data would be sufficient; if the access level data were "G" or "PG", the access level data would be insufficient. If the access level data is sufficient, routine 500 proceeds to step 505; if not, the routine proceeds to step 504.

At step 504, the processor 134 may determine if secondary access level data associated with the disc request is sufficient for the access requirement data associated with the title data included in the disc request. For example, a movie may have access requirement data of "Horror genre", and a user may not have the corresponding access level data of "Horror genre". However, the user may have a secondary access level data of "Horror genre before 5:00 p.m.". If this is the case, the processor 134 may determine if the secondary condition is met (i.e., if it is before 5:00 p.m.). If so, the routine 500 proceeds to step 505; if not, the routine 500 proceeds to step 506. For another example, a CD may have access requirement data of "parental advisory: explicit lyrics", and a user may not have the corresponding access level data of "parental advisory: explicit lyrics". However, an exception may have been stored in the memory device 136 for the specific CD being requested. If this is the case, the processor 134 may determine that the secondary condition is met (i.e., an exception applies), and the routine 500 may proceed to step 505; if not, the routine 500 proceeds to step 506.

At step 505, the processor 134 determines a respective unique storage identifier associated with the title data included in the disc request (such as by accessing the memory device 136), and the processor 134 actuates the disc transporter 124 to transport the desired media disc from the disc storage location 114 having the unique storage identifier to the reading location 112. As noted above, the disc output element 126 ejects media discs transported to the reading location 112 by the disc transporter 124.

At step 506, the processor 134 refuses to provide the requested media disc to the user and actuates the display 138 to explain that the user's access level data is not sufficient to access the requested media disc.

It is understood that while certain forms of this invention have been illustrated and described, it is not limited thereto except insofar as such limitations are included in the following claims and allowable functional equivalents thereof.

The invention claimed is:

1. A media storage system for use with a plurality of media discs, the system comprising:
   a disc reading location;
   a disc input element for accepting a respective media disc from outside said storage system to said disc reading location;
   a disc output element for ejecting a respective media disc from said disc reading location to outside said storage system;
   a plurality of disc storage locations each having a unique storage identifier;
   a disc transporter for moving respective media discs between said disc reading location and said disc storage locations;
   a media reader adjacent said disc reading location;
   a processor in data communication with: a memory device, a data input device, a data output device, said media reader, said disc transporter, and said disc output element;
   wherein said data output device is a display on a handheld remote control displaced from said processor and said data input device is an input on said remote control, said display and said input being in data communication with said processor via radio transmitters and receivers;
   wherein said processor includes programming for obtaining title data for a respective media disc received at said disc reading location from outside said storage system;
   wherein said processor includes programming for associating in said memory device said title data with a respective unique storage identifier for a respective storage location which at that moment does not store a respective media disc; and
   wherein said processor includes programming for actuating said disc transporter to transport said media disc from said disc reading location to said storage location having said unique storage identifier associated with said title data of said media disc;
   wherein:
     said processor includes programming for obtaining respective access requirement data for each respective media disc inside said storage system and associating in said memory device said access requirement data with respective title data of each said media disc;
     said processor includes programming for obtaining a disc request from said data input device, said disc request including title data of a respective media disc stored in a respective storage location and access level data;
     said processor includes programming for determining a respective unique storage identifier associated with said title data included in said disc request;
     said processor includes programming for determining if said access level data included in said disc request is sufficient for respective access requirement data associated with said title data included in said disc request, and if sufficient, actuating said disc transporter to transport a respective media disc stored in a respective disc storage location having said unique storage identifier associated with said title data included in said disc request to said disc reading location;
     said disc output element ejects all respective media discs transported to said disc reading location by said disc transporter;

wherein said programming for obtaining respective access requirement data for each respective media disc inside said storage system includes:
programming in said processor for obtaining said access requirement data from said media reader;
programming in said processor for obtaining said access requirement data from said memory device based on identifying data obtained from said media reader; and
programming in said processor for actuating said data output device to request said access requirement data from said data input device if said access requirement data is not obtained from said media reader or said memory device.

2. The system as in claim 1, wherein:
said processor includes programming for obtaining a disc request from said data input device, said disc request including title data of a respective media disc stored in a respective storage location;
said processor includes programming for determining a respective unique storage identifier associated with said title data included in said disc request;
said processor includes programming for actuating said disc transporter to transport a respective media disc stored in a respective disc storage location having said unique storage identifier associated with said title data included in said disc request to said disc reading location; and
said disc output element ejects said respective media disc from said disc reading location to outside said storage system to fulfill said disc request.

3. The system as in claim 2, wherein:
said data output device is a display on a remote control;
said data input device is an input on said remote control;
said display and said input are in data communication with said processor via radio transmitters and receivers; and
said processor includes programming for actuating said display to present a list of all title data for media discs stored in said system.

4. The system as in claim 1, wherein said programming for obtaining title data for a respective media disc received at said disc reading location from outside said storage system includes:
programming in said processor for obtaining said title data from said media reader;
programming in said processor for obtaining said title data from said memory device based on identifying data obtained from said media reader; and
programming in said processor for actuating said data output device to request said title data from said data input device if said title data is not obtained from said media reader or said memory device.

5. The system as in claim 1, wherein said processor is in data communication with a network, and wherein said programming for obtaining title data for a respective media disc received at said disc reading location from outside said storage system includes at least one of:
programming in said processor for obtaining said title data from said media reader;
programming in said processor for obtaining said title data from said memory device based on identifying data obtained from said media reader;
programming in said processor for obtaining said title data from said network based on identifying data obtained from said media reader; and
programming in said processor for actuating said data output device to request said title data from said data input device.

6. The system as in claim 1, wherein said processor includes programming for determining if said access requirement data includes secondary access data that modifies said access requirement data, so that access to a respective media disc is one of permitted, delayed, or denied.

* * * * *